US012596390B2

(12) United States Patent
She et al.

(10) Patent No.: US 12,596,390 B2
(45) Date of Patent: Apr. 7, 2026

(54) TEMPERATURE ADJUSTMENT METHOD FOR AN INTELLIGENT TOILET, AN ELECTRONIC DEVICE, A STORAGE MEDIUM, AND AN INTELLIGENT TOILET

(71) Applicant: Shanghai Kohler Electronics, Ltd., Shanghai (CN)

(72) Inventors: Yan She, Shanghai (CN); Haixing Sun, Shanghai (CN)

(73) Assignee: Shanghai Kohler Electronics, Ltd., Shanghai (CN)

( * ) Notice: Subject to any disclaimer, the term of this patent is extended or adjusted under 35 U.S.C. 154(b) by 48 days.

(21) Appl. No.: 18/392,834

(22) Filed: Dec. 21, 2023

(65) Prior Publication Data

US 2024/0219940 A1     Jul. 4, 2024

(30) Foreign Application Priority Data

Dec. 29, 2022     (CN) .......................... 202211708669.7

(51) Int. Cl.
| | |
|---|---|
| *G05D 23/19* | (2006.01) |
| *E03D 5/10* | (2006.01) |
| *E03D 9/04* | (2006.01) |

(52) U.S. Cl.
CPC ........... *G05D 23/1917* (2013.01); *E03D 5/10* (2013.01); *E03D 9/04* (2013.01)

(58) Field of Classification Search
CPC ....... F24H 15/421; F24H 15/208; E03D 5/10; G05D 23/1917
See application file for complete search history.

(56) References Cited

U.S. PATENT DOCUMENTS 5,184,355 A * 2/1993 Taguchi .................... E03D 9/00
4/420

FOREIGN PATENT DOCUMENTS

| | | |
|---|---|---|
| CN | 1955370 A | 5/2007 |
| CN | 101009874 A | 8/2007 |
| CN | 102033995 A | 4/2011 |
| CN | 204923334 U | 12/2015 |
| CN | 108304013 A | 7/2018 |
| CN | 109725664 A | 5/2019 |

(Continued)

OTHER PUBLICATIONS

Chinese Office Action from Chinese Patent Application No. 2025052100013720, dated May 21, 2025, 10 pages. (including English summary).

(Continued)

*Primary Examiner* — Lauren A Crane
(74) *Attorney, Agent, or Firm* — Lempia Summerfield Katz LLC

(57) ABSTRACT

A temperature adjustment method by using an intelligent toilet includes obtaining an indoor temperature from an air temperature sensor of the intelligent toilet in response to a determination that a warm air function or a flushing function remains inactivated for a preset time duration. The method also includes determining a to-be-adjusted temperature setting according to the indoor temperature. The method also includes setting a current temperature setting of the intelligent toilet to the to-be-adjusted temperature setting in response to a determination that the current temperature setting of the intelligent toilet is different from the to-be-adjusted temperature setting.

20 Claims, 5 Drawing Sheets

(56) References Cited

FOREIGN PATENT DOCUMENTS

| CN | 213429865 U | 6/2021 |
|----|-------------|--------|
| CN | 113520203 A | 10/2021 |
| CN | 114690868 A | 7/2022 |

OTHER PUBLICATIONS

Chinese Notification of Rejection for Chinese Patent Application No. 202211708669.7 dated Dec. 12, 2025, 12 pages (including English summary).

* cited by examiner

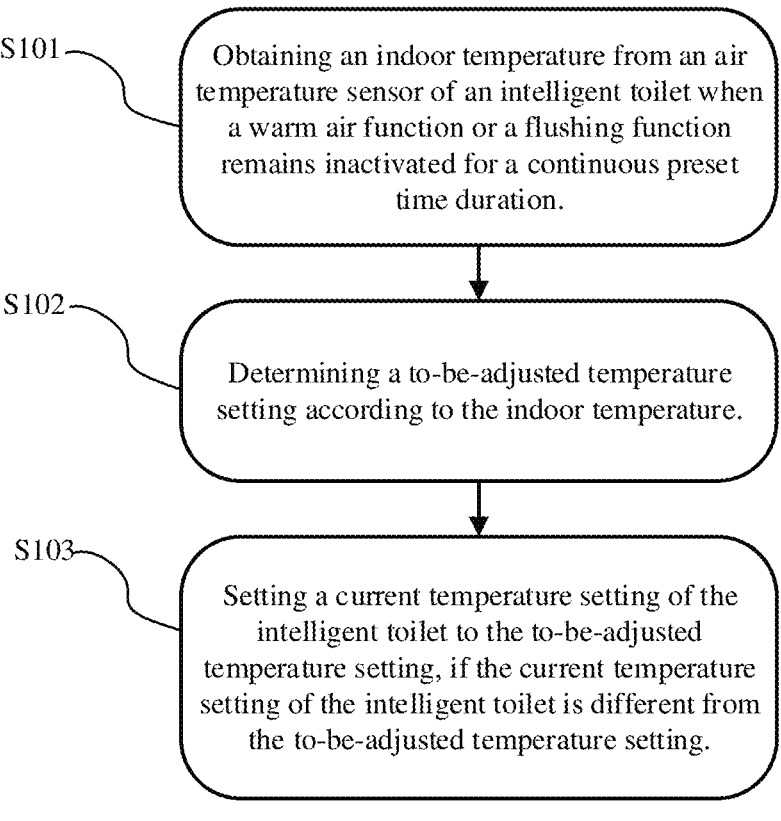

S101 — Obtaining an indoor temperature from an air temperature sensor of an intelligent toilet when a warm air function or a flushing function remains inactivated for a continuous preset time duration.

S102 — Determining a to-be-adjusted temperature setting according to the indoor temperature.

S103 — Setting a current temperature setting of the intelligent toilet to the to-be-adjusted temperature setting, if the current temperature setting of the intelligent toilet is different from the to-be-adjusted temperature setting.

FIG. 1

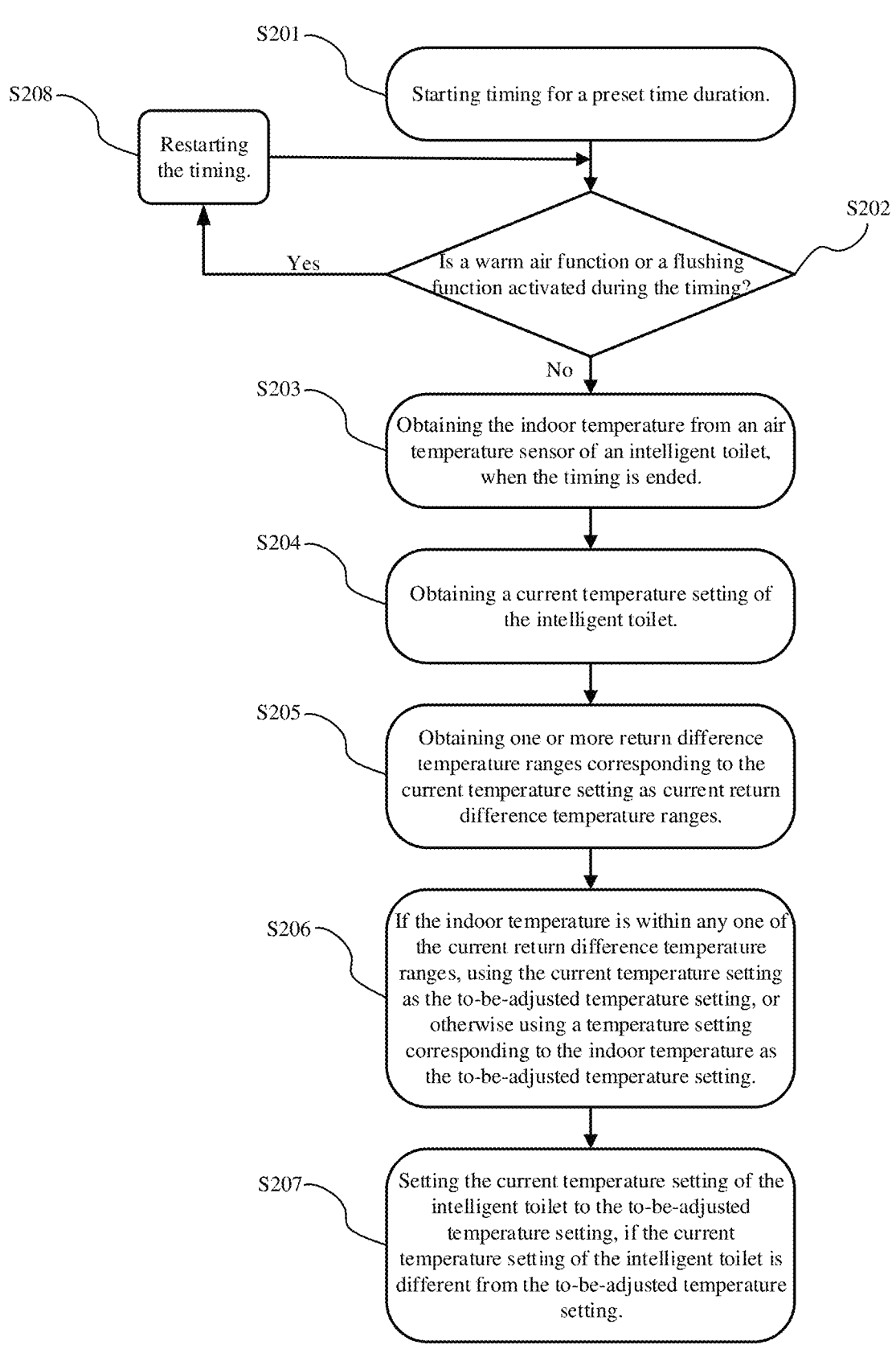

S201 — Starting timing for a preset time duration.

S208 — Restarting the timing.

S202 — Is a warm air function or a flushing function activated during the timing?

Yes

No

S203 — Obtaining the indoor temperature from an air temperature sensor of an intelligent toilet, when the timing is ended.

S204 — Obtaining a current temperature setting of the intelligent toilet.

S205 — Obtaining one or more return difference temperature ranges corresponding to the current temperature setting as current return difference temperature ranges.

S206 — If the indoor temperature is within any one of the current return difference temperature ranges, using the current temperature setting as the to-be-adjusted temperature setting, or otherwise using a temperature setting corresponding to the indoor temperature as the to-be-adjusted temperature setting.

S207 — Setting the current temperature setting of the intelligent toilet to the to-be-adjusted temperature setting, if the current temperature setting of the intelligent toilet is different from the to-be-adjusted temperature setting.

FIG. 2

TEMPERATURE ADJUSTMENT METHOD FOR AN INTELLIGENT TOILET, AN ELECTRONIC DEVICE, A STORAGE MEDIUM, AND AN INTELLIGENT TOILET

CROSS REFERENCE TO RELATED APPLICATION

This application claims the benefit of priority to: Chinese Patent Application No. 202211708669.7 filed in the Chinese Intellectual Property Office on Dec. 29, 2022, which is hereby incorporated by reference in its entirety.

FIELD

The present disclosure relates to the technical field of intelligent toilet and particularly relates to a temperature adjustment method for an intelligent toilet, an electronic device, a storage medium, and an intelligent toilet.

BACKGROUND

An intelligent toilet includes an air duct, and the air duct i includes a blower and a warm air heater to provide hot air for the user. The intelligent toilet is provided with a plurality of temperature settings, so that the user can select different temperature settings according to the indoor temperature.

However, the temperature adjustment of the intelligent toilet has to be manually adjusted by the user through a keypad or a remote control. This may be difficult for the elderly, children, and other groups of the user to operate the temperature adjustment.

SUMMARY

The present disclosure aims to address the technical problem that the temperature setting of the intelligent toilet in prior art can be only manually adjusted and thus it is difficult for the elderly, children, and other groups of the user to operate the temperature adjustment. Thus, it is necessary to provide a temperature adjustment method for an intelligent toilet, an electronic device, a storage medium, and an intelligent toilet.

According to an embodiment, the present disclosure provides a temperature adjustment method for an intelligent toilet.

The method includes obtaining an indoor temperature from an air temperature sensor of the intelligent toilet in response to a determination that a warm air function or a flushing function remains inactivate for a preset time duration; determining a to-be-adjusted temperature setting according to the indoor temperature; and in response to a determination that the current temperature setting of the intelligent toilet is different from the to-be-adjusted temperature setting.

According to another embodiment, obtaining the indoor temperature from the air temperature sensor of the intelligent toilet includes obtaining the indoor temperature from the air temperature sensor disposed in an air outlet duct of the intelligent toilet and disposed at an air outlet of the air outlet duct.

According to another embodiment, obtaining the indoor temperature from the air temperature sensor of the intelligent toilet includes obtaining a measured value from the air temperature sensor of the intelligent toilet and correcting the measured value based on a preset compensation value to obtain the indoor temperature.

According to another embodiment, obtaining the indoor temperature from the air temperature sensor of the intelligent toilet in response to the determination that the warm air function or the flushing function remains inactivated for the preset time duration includes: starting a timing for the preset time duration; restarting the timing, in response to a determination that the warm air function or the flushing function is activated during the preset time duration; and obtaining the indoor temperature from the air temperature sensor of the intelligent toilet, in response to a determination that the timing is ended after the preset time duration.

According to another embodiment, determining the to-be-adjusted temperature setting according to the indoor temperature includes obtaining the current temperature setting of the intelligent toilet.

Determining the to-be-adjusted temperature setting according to the indoor temperature also includes obtaining one or more return difference temperature ranges corresponding to the current temperature setting.

Determining the to-be-adjusted temperature setting according to the indoor temperature also includes using the one or more return difference temperature ranges as one or more current return difference temperature ranges.

Determining the to-be-adjusted temperature setting according to the indoor temperature also includes in response to a determination that the indoor temperature is within one of the one or more current return difference temperature ranges, using the current temperature setting as the to-be-adjusted temperature setting, or otherwise using a temperature setting corresponding to the indoor temperature as the to-be-adjusted temperature setting.

According to another embodiment, obtaining the temperature setting corresponding to the indoor temperature includes in response to a determination that $T<T1$, determining that the temperature setting corresponding to the indoor temperature is a third setting.

Obtaining the temperature setting corresponding to the indoor temperature also includes in response to a determination that $T1 \leq T \leq T2$, determination that the temperature setting corresponding to the indoor temperature is a second setting.

Obtaining the temperature setting corresponding to the indoor temperature also includes in response to a determination that $T2<T \leq T3$, determination that the temperature setting corresponding to the indoor temperature is a first setting.

Obtaining the temperature setting corresponding to the indoor temperature also includes in response to a determination that $T>T3$, determination that the temperature setting corresponding to the indoor temperature is a closed setting.

T is the indoor temperature, $T1$ is a first temperature threshold, $T2$ is a second temperature threshold, $T3$ is a third temperature threshold, and $T1<T2<T3$.

According to another embodiment, using the one or more return difference temperature ranges corresponding to the current temperature setting as the one or more current return difference temperature ranges includes in response to a determination that the current temperature setting is the third setting, determining that the corresponding return difference temperature range is: $T1L<T<T1H$. $T1L$ is a lower limit value of the first temperature threshold and $T1H$ is an upper limit value of the first temperature threshold.

Using the one or more return difference temperature ranges corresponding to the current temperature setting as the one or more current return difference temperature ranges also includes in response to a determination that the current temperature setting is the second setting, determining that the corresponding return difference temperature range is $T1L<T<T1H$ and/or $T2L<T<T2H$. T2L is a lower limit value of the second temperature threshold and T2H is an upper limit value of the second temperature threshold;

Using the one or more return difference temperature ranges corresponding to the current temperature setting as the one or more current return difference temperature ranges also includes in response to a determination that the current temperature setting is the first setting, determining that the corresponding return difference temperature range is $T2L<T<T2H$ and/or $T3L<T<T3H$. T3L is a lower limit value of the third temperature threshold and T3H is an upper limit value of the third temperature threshold.

Using the one or more return difference temperature ranges corresponding to the current temperature setting as the one or more current return difference temperature ranges also includes in response to a determination that the current temperature setting is the closed setting, determining that the corresponding return difference temperature range is $T3L<T<T3H$.

According to another embodiment, the present disclosure also provides an electronic device.

The electronic device also includes at least one processor; and a memory communicatively connected to the at least one processor. The memory is configured to store instructions executable by the at least one processor. The instructions are executed by the at least one processor to enable the at least one processor to perform the intelligent toilet temperature adjustment method as described above.

According to another embodiment, the present disclosure also provides a storage medium. The storage medium is configured to store computer instructions for performing all steps of the intelligent toilet temperature adjustment method as described above when a computer executes the computer instructions.

According to another embodiment, the present disclosure also provides an intelligent toilet. The intelligent toilet includes a toilet body and an electronic device. An air duct of the toilet body includes a blower, a warm air heater, and an air temperature sensor disposed at an air outlet of the air duct. The air temperature sensor is communicatively connected to the electronic device. The electronic device is configured to perform the temperature adjustment method for the intelligent toilet as described above.

The temperature adjustment method for the intelligent toilet, the electronic device, the storage medium, and the intelligent toilet according to the present disclosure may obtain the indoor temperature from the air temperature sensor of the intelligent toilet when the warm air or flushing function remains inactivated for a continuous preset time duration. Thus, the air temperature sensor within the intelligent toilet may be used to obtain the indoor temperature without additionally increasing sensor costs. After the indoor temperature is obtained, the temperature setting of the intelligent toilet may be automatically adjusted. Thus, user operations may be simplified to facilitate the use for more user groups, and energy may be saved.

BRIEF DESCRIPTION OF THE FIGURES

FIG. 1 is a workflow diagram of a temperature adjustment method for an intelligent toilet according to an embodiment of the present disclosure;

FIG. 2 is a workflow diagram of a temperature adjustment method for an intelligent toilet according to another embodiment of the present disclosure;

DETAILED DESCRIPTION

Figure 3:
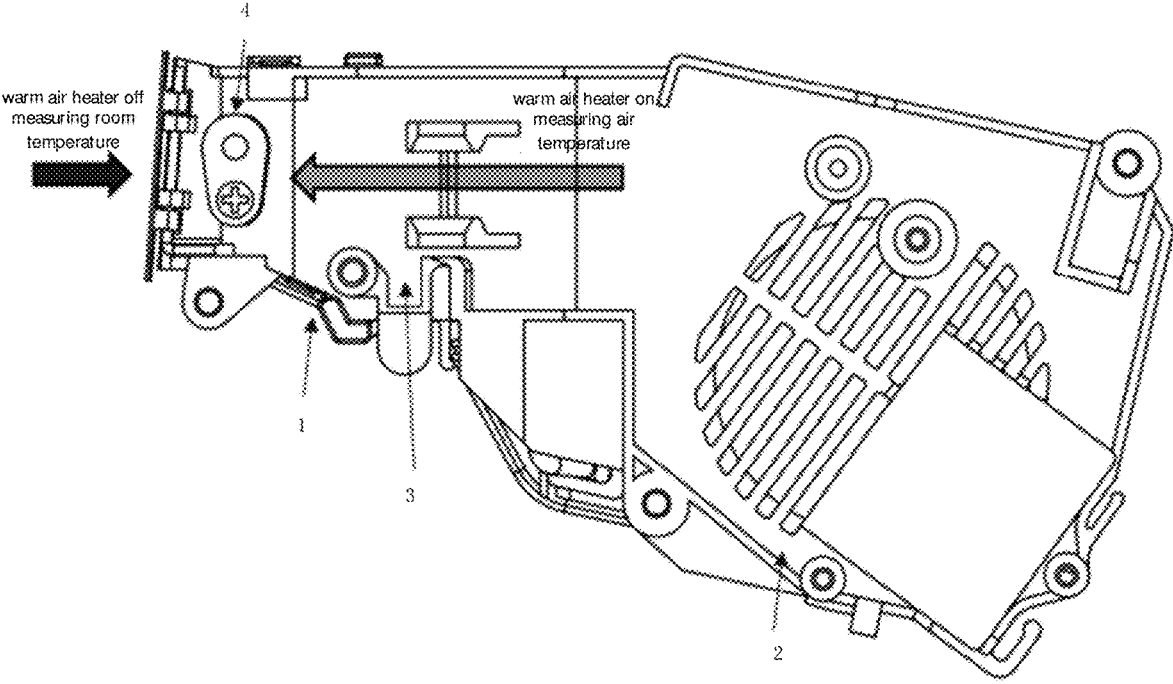
FIG. 3 is a sectional view of an air duct according to an embodiment of the present disclosure.

The specific embodiments of the present disclosure are further described with reference to the drawings hereinafter. Same or equivalent parts are denoted by same reference numerals. It should be noted that the terms "front", "back", "left", "right", "up" and "down" used in the following description refer to the directions in the drawings, and the terms "inner" and "outer" refer to the directions towards or far away from geometric centers of specific parts respectively.

FIG. 1 is a workflow diagram of a temperature adjustment method for an intelligent toilet according to an embodiment of the present disclosure.

In step S101, an indoor temperature is obtained from an air temperature sensor of the intelligent toilet when a warm air function or a flushing function remains inactivated for a continuous preset time duration.

In step S102, a to-be-adjusted temperature setting is determined according to the indoor temperature.

In step S103, a current temperature setting of the intelligent toilet is set to the to-be-adjusted temperature setting, if the current temperature setting of the intelligent toilet is different from the to-be-adjusted temperature setting.

Specifically, the present disclosure can be applied to an electronic device, with processing capability, of the intelligent toilet. When the warm air function or the flushing function remains inactivated for the continuous preset time duration, step S101 is performed to obtain the indoor temperature from the air temperature sensor of the intelligent toilet.

FIG. 3 shows an air duct structure of the intelligent toilet according to an embodiment of the present disclosure. A blower 2, a warm air heater 3, and an air temperature sensor 4 are disposed in an air duct 1. The air duct structure may use the air temperature sensor 4 to detect the indoor temperature without additionally increasing sensor costs. The air temperature sensor 4 may be shared. The air temperature sensor 4 is configured to measure the warm air temperature when the warm air heater 3 is activated. However, because the air temperature sensor 4 is exposed to the air, the measured temperature is closest to the actual room temperature outside when the warm air module is not operating. Therefore, in step S101, the indoor temperature is obtained from the air temperature sensor of the intelligent toilet only when the warm air function or the flushing function remains inactivated for a continuous preset time duration.

Then, step S102 is performed to determine the to-be-adjusted temperature setting according to the detected indoor temperature. Step S103 is performed to set the current temperature setting of the intelligent toilet to the to-be-adjusted temperature setting, if the current temperature setting of the intelligent toilet is different from the to-be-adjusted temperature setting. There may be no need to update the temperature setting of the intelligent toilet, if the current temperature setting of the intelligent toilet is the same as the to-be-adjusted temperature setting.

The temperature setting of the intelligent toilet comprises, but is not limited to, a flushing temperature setting and/or a seat temperature setting.

The temperature adjustment method for the intelligent toilet present disclosure may obtain the indoor temperature from the air temperature sensor of the intelligent toilet when the warm air or flushing function remains inactivated for a continuous preset time duration. Thus, the air temperature sensor within the intelligent toilet may be used to obtain the indoor temperature without additionally increasing sensor costs. After the indoor temperature is obtained, the temperature setting of the intelligent toilet may be automatically adjusted. Thus, user operations may be simplified to facilitate the use for more user groups, and energy may be saved.

FIG. 2 is a workflow diagram of a temperature adjustment method for an intelligent toilet according to another embodiment of the present disclosure.

In step S201, a timing is started for a preset time duration.

In step S202, the timing is restarted, if it is detected or determined that the warm air function or the flushing function is activated during the timing.

In step S203, the indoor temperature is obtained from the air temperature sensor of the intelligent toilet, when the timing is ended.

In an embodiment, obtaining the indoor temperature from the air temperature sensor of the intelligent toilet specifically comprises obtaining the indoor temperature from the air temperature sensor situated in an air outlet duct of the intelligent toilet and disposed at an air outlet of the air outlet duct.

In an embodiment, obtaining the indoor temperature from the air temperature sensor of the intelligent toilet comprises obtaining a measured value from the air temperature sensor of the intelligent toilet and correcting the measured value based on a preset compensation value to obtain the indoor temperature.

In step S204, the current temperature setting of the intelligent toilet is obtained.

In step S205, one or more return difference temperature ranges corresponding to the current temperature setting is obtained as a current return difference temperature range.

In step S206, if the indoor temperature is within any one of the current return difference temperature ranges, the current temperature setting is obtained or used as the to-be-adjusted temperature setting. Otherwise, a temperature setting corresponding to the indoor temperature is obtained or used as the to-be-adjusted temperature setting.

In an embodiment, obtaining the temperature setting corresponding to the indoor temperature comprises the following steps.

If $T<T1$, the temperature setting corresponding to the indoor temperature is a third setting.

If $T1 \leq T \leq T2$, the temperature setting corresponding to the indoor temperature is a second setting.

If $T2<T \leq T3$, the temperature setting corresponding to the indoor temperature is a first setting.

If $T>T3$, the temperature setting corresponding to the indoor temperature is a closed setting.

T is the indoor temperature, T1 is a first temperature threshold, T2 is a second temperature threshold, T3 is a third temperature threshold, and $T1<T2<T3$.

In an embodiment, obtaining one or more return difference temperature ranges corresponding to the current temperature setting as a current return difference temperature range comprises the following steps.

If the current temperature setting is the third setting, the corresponding return difference temperature range is $T1L<T<T1H$. T1L is a lower limit value of the first temperature threshold and T1H is an upper limit value of the first temperature threshold.

If the current temperature setting is the second setting, the corresponding return difference temperature range is: $T1L<T<T1H$, and/or $T2L<T<T2H$. T2L is a lower limit value of the second temperature threshold and T2H is an upper limit value of the second temperature threshold.

If the current temperature setting is the first setting, the corresponding return difference temperature range is $T2L<T<T2H$ and/or $T3L<T<T3H$. T3L is a lower limit value of the third temperature threshold and T3H is an upper limit value of the third temperature threshold.

If the current temperature setting is the closed setting, the corresponding return difference temperature range is $T3L<T<T3H$.

In step S207, the current temperature setting of the intelligent toilet is set to the to-be-adjusted temperature setting, if the current temperature setting of the intelligent toilet is different from the to-be-adjusted temperature setting.

Specifically, step S201 is first performed to start timing, e.g., after the preset time duration.

In an embodiment, when the whole machine is powered on, in step S201, the timing is started and performed, e.g., for a preset time duration.

During the timing process, whether the warm air function or the flushing function is activated is detected in step S202. If it is detected that the warm air function or the flushing function is activated during the timing process (No in step S202), step S208 is performed to restart the timing. Step S203 is performed, when the warm air function or the flushing function is not activated during the timing process and the timing is ended, e.g., after the preset time duration (Yes in step S202), to obtain the room temperature from the air temperature sensor of the intelligent toilet.

In an embodiment, obtaining the indoor temperature from the air temperature sensor of the intelligent toilet comprises obtaining the indoor temperature from the air temperature sensor disposed in the air outlet duct of the intelligent toilet and disposed at the air outlet of the air outlet duct.

The air temperature sensor of the embodiment is disposed at the air outlet so that a more accurate indoor temperature can be obtained.

In an embodiment, obtaining the indoor temperature from the air temperature sensor of the intelligent toilet comprises obtaining a measured value from the air temperature sensor of the intelligent toilet and correcting the measured value based on a preset compensation value to obtain the indoor temperature.

Specifically, the indoor temperature is obtained by adding a compensation value $\Delta T$ to the measured value. The compensation value $\Delta T$ may be determined by several experiments in advance.

In the embodiment, the compensation temperature is set to reduce the influence of heat preservation of the seat and water heater on the measured value of the air temperature sensor, so as to make the room temperature measurement more accurate.

Then, step S204 is performed to obtain the current temperature setting of the intelligent toilet. The temperature setting comprises but is not limited to a flushing temperature setting and/or a seat temperature setting.

In order to prevent the temperature setting from fluctuating back and forth when the room temperature is at a critical value and thus prevent the user experience from being affected, the return difference temperature range is introduced. Different temperature settings correspond to one or more return difference temperature ranges. In step S205, one or more return difference temperature ranges corresponding to the current temperature setting are obtained or used as a current return difference temperature range.

Step S206 is performed to make a determination based on the indoor temperature and the current return difference temperature range. If the obtained indoor temperature is within any one of the current return difference temperature ranges, the current temperature setting is obtained or used as the to-be-adjusted temperature setting, and no adjustment is required. Otherwise, it is necessary to adjust the temperature setting of the intelligent toilet and obtain or use the temperature setting corresponding to the indoor temperature as the to-be-adjusted temperature setting.

Lastly, step S207 is performed to set the current temperature setting of the intelligent toilet to the to-be-adjusted temperature setting, if the current temperature setting of the intelligent toilet is different from the to-be-adjusted temperature setting. There is no need to adjust, if the current temperature setting of the intelligent toilet is the same as the to-be-adjusted temperature setting.

In an embodiment, obtaining the temperature setting corresponding to the indoor temperature comprises the following steps.

If $T<T1$, the temperature setting corresponding to the indoor temperature is a third setting.

If $T1 \leq T \leq T2$, the temperature setting corresponding to the indoor temperature is a second setting.

If $T2<T \leq T3$, the temperature setting corresponding to the indoor temperature is a first setting.

If $T>T3$, the temperature setting corresponding to the indoor temperature is a closed setting.

T is the indoor temperature, T1 is a first temperature threshold, T2 is a second temperature threshold, T3 is a third temperature threshold, and $T1<T2<T3$.

In an embodiment, obtaining one or more return difference temperature ranges corresponding to the current temperature setting as a current return difference temperature range comprises the following steps.

If the current temperature setting is the third setting, the corresponding return difference temperature range is $T1L<T<T1H$. T1L is a lower limit value of the first temperature threshold and T1H is an upper limit value of the first temperature threshold.

If the current temperature setting is the second setting, the corresponding return difference temperature range is $T1L<T<T1H$ and/or $T2L<T<T2H$. T2L is a lower limit value of the second temperature threshold and T2H is an upper limit value of the second temperature threshold.

If the current temperature setting is the first setting, the corresponding return difference temperature range is $T2L<T<T2H$ and/or $T3L<T<T3H$. T3L is a lower limit value of the third temperature threshold and T3H is an upper limit value of the third temperature threshold.

If the current temperature setting is the closed setting, the corresponding return difference temperature range is $T3L<T<T3H$.

Specifically, the temperature settings are set according to Table 1 to ensure both comfort and energy savings.

TABLE 1

| | Current room temperature | Temperature settings |
|---|---|---|
| Temperature setting | $T < T1$ | Third setting |
| | $T1 \leq T \leq T2$ | Second setting |
| | $T2 < T \leq T3$ | First setting |
| | $T > T3$ | Closed setting (OFF setting) |

TABLE 1-continued

| | Current room temperature | Temperature settings |
|---|---|---|
| Return difference temperature range | $T1L < T < T1H$ | Maintaining the current setting (the second setting or the third setting) |
| | $T2L < T < T2H$ | Maintaining the current setting (the first setting or the second setting) |
| | $T3L < T < T3H$ | Maintaining the current setting (the closed setting or the first setting) |

T1, T2, and T3 are the setting temperature thresholds set by the software, and T1L, T1H, T2L, T2H, T3L, and T3H respectively correspond to the upper and lower limit values of the return difference temperatures of T1, T2 and T3.

The three settings of the target temperatures of seat heating are different from each other, and the three settings of water heating in the three settings are different from each other. The first setting of the water heating target temperature is greater than the second setting of the water heating target temperature. The second setting of the water heating target temperature is greater than the third setting of the water heating target temperature. The first setting of the seat heating target temperature is greater than the second setting of the seat heating target temperature. The second setting of the seat heating target temperature is greater than the third setting of the seat heating target temperature. The specific settings of the water heating target temperatures and the seat heating target temperatures are shown in Table 2.

TABLE 2

| | Setting | Target temperature |
|---|---|---|
| Water heating target temperature | First setting | THWater° C. |
| | Second setting | TMWater° C. |
| | Third setting | TLWater° C. |
| Seat heating target temperature | First setting | THSeat° C. |
| | Second setting | TMSeat° C. |
| | Third setting | TLSeat° C. |

In other words, THWater ° C.>TMWater ° C.>TLWater ° C., and THSeat ° C.>TMSeat ° C.>TLSeat ° C. Different target temperatures may be achieved by adjusting the heating power.

In this embodiment, the indoor temperature may be obtained through the air temperature sensor at the air outlet when the whole machine is powered on. Thus, on one hand, an accurate indoor temperature can be obtained, and on the other hand, no additional cost is incurred. The methods as described above may automatically determine the temperature setting. This may simplify user operations and facilitate the use of a larger user group. Fluctuation is avoided by setting the return difference temperature range. Finally, the methods as described above may set the appropriate relationship between the temperature setting and the indoor temperature, and thus comfort and energy saving are ensured.

Figure 4:
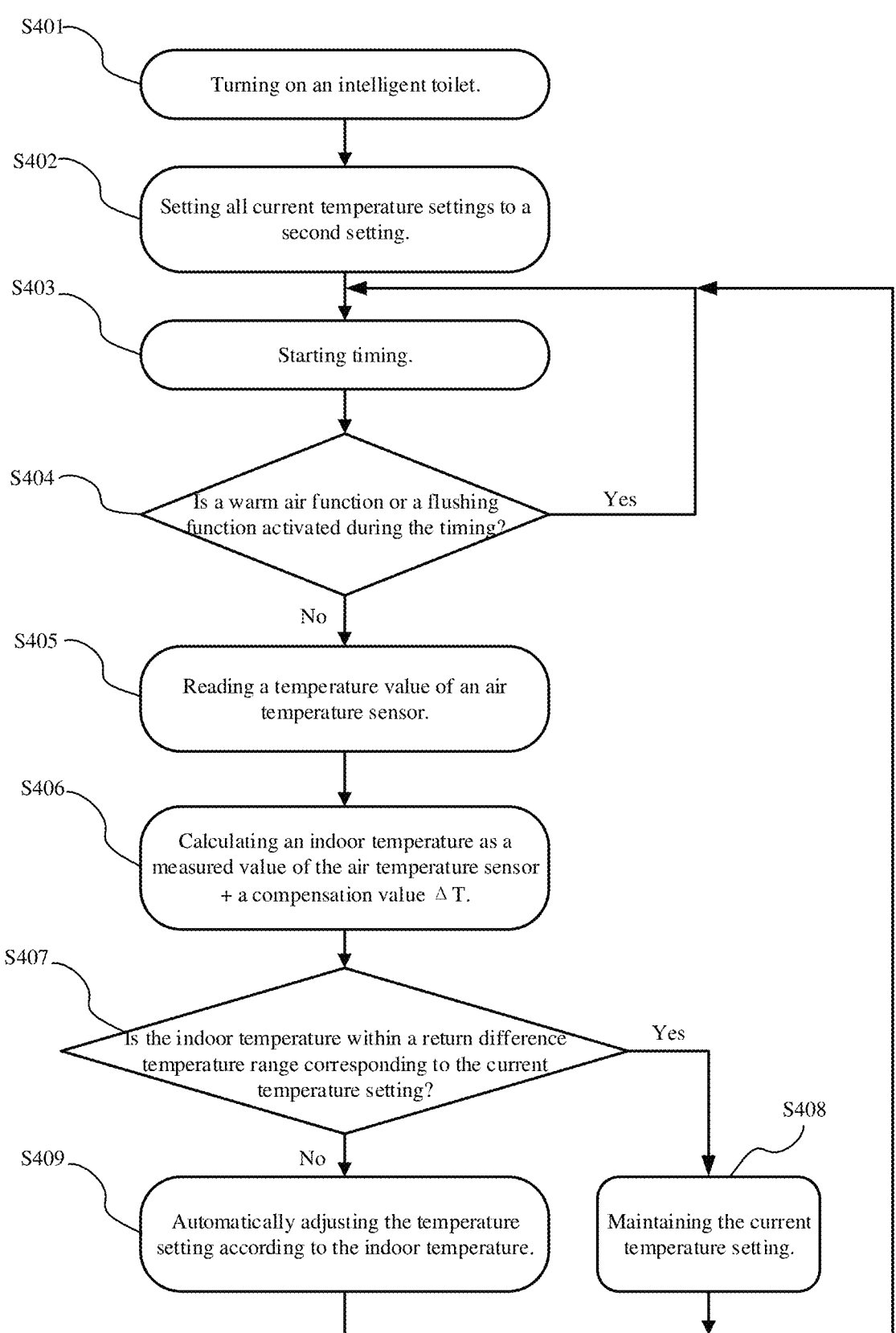
FIG. 4 is a workflow diagram of a temperature adjustment method for an intelligent toilet according to an embodiment of the present disclosure.

FIG. 4 is a workflow diagram of a temperature adjustment method for an intelligent toilet according to an embodiment of the present disclosure.

In step S401, the machine (e.g., the intelligent toilet) is turned on.

In step S402, the current temperature settings are all set to a second setting, i.e., the middle setting.

In step S403, a timing is started and performed, e.g., for a preset time duration.

In step S404, whether a warm air function or a flushing function is activated, e.g., during the preset time duration is determined. If the warm air function or the flushing function is activated, e.g., during the preset time duration (Yes in S404), step S403 is performed. Otherwise, when the timing is ended, e.g., after the preset time duration (No in S404), step S405 is performed.

In step S405, the temperature value of the air temperature sensor is read.

In step S406, the current indoor temperature is calculated as the measured value of the air temperature sensor+the compensation value ΔT.

In step S407, whether the indoor temperature is within the return difference temperature range corresponding to the current temperature setting is determined. If the indoor temperature is within the return difference temperature range corresponding to the current temperature setting (Yes in S407), step S408 is determined. Otherwise (No in S407), step S409 is performed.

In step S408, the current setting is maintained.

In step S409, the temperature setting is automatically adjusted according to the indoor temperature.

Specifically, the air temperature sensor 4 as shown in FIG. 3 may be used to detect the indoor temperature without additionally increasing sensor costs. The air temperature sensor 4 is located close to the air outlet and exposed to the air. The measured temperature is closest to the actual room temperature outside when the warm air module is not operated. In an embodiment, the air temperature sensor 4 is mounted inside the air duct 1 and near the middle position of the air outlet. When the warm air heater 3 and the blower 2 are turned on, the air temperature sensor 4 measures or detects the warm air temperature. When the warm air heater 3 and the warm air blower 2 are turned off, the air temperature sensor 4 measures or detects the indoor temperature.

The user can set the temperature to the automatic temperature adjustment mode by pressing a button or a "temperature" button on a remote control. In the automatic temperature adjustment mode, the intelligent toilet performs steps S401 to S409 and automatically sets the flushing temperature and the seat temperature to appropriate settings according to the indoor temperature obtained by the warm air sensor.

The indoor temperature is calculated as the measured value of air temperature sensor+compensation value ΔT. By setting the compensation temperature ΔT, the influence of heat preservation of the seat and water heater on the measured value of the air temperature sensor is reduced, so as to make the room temperature measurement more accurate.

Meanwhile, the return difference temperature range is set to prevent the temperature setting from fluctuating back and forth when the room temperature is at a critical value and thus prevent the user experience from being affected.

Timing begins when the whole machine is powered on, and if the warm air function or the flushing function remains inactivated for a continuous time duration (e.g., 8 hours), the air temperature sensor measures the temperature to ensure the reliability of the measured temperature.

If the warm air function or flushing function is activated during the timing process, the timing will be restarted to prevent water heating and warm air heating from interfering with the measurement accuracy of the air temperature sensor.

Figure 5:
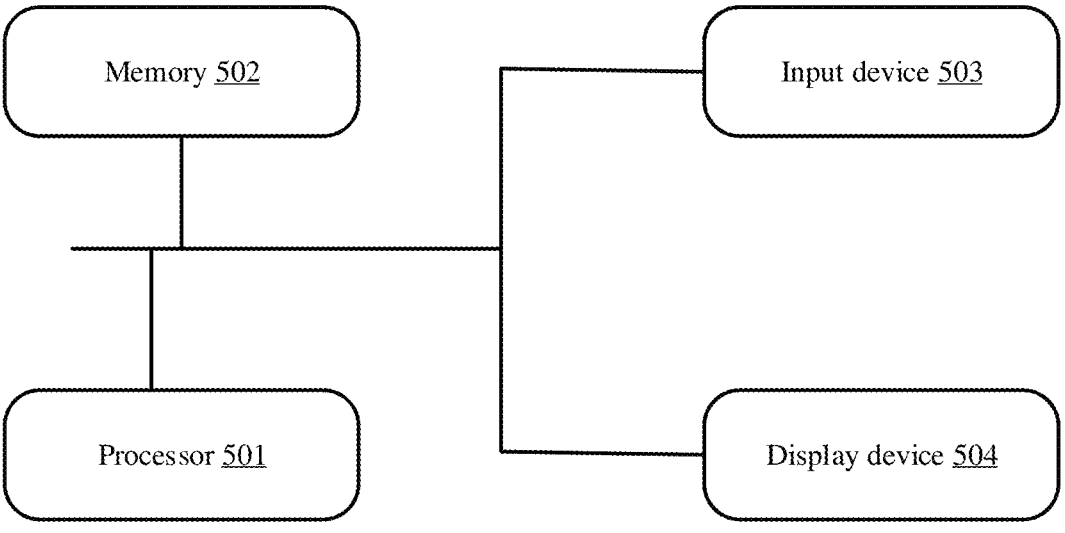
FIG. 5 is a schematic diagram of a hardware structure of an electronic device of the present disclosure.

FIG. 5 is a schematic diagram of a hardware structure of an electronic device of the present disclosure.

The electric device comprises at least one processor 501 and a memory 502 communicatively connected to the at least one processor 501.

The memory 502 may store instruction executable by the at least one processor. The instructions are executed by the at least one processor to enable the at least one processor to perform the temperature adjustment method for the intelligent toilet as described above. The memory 502 may include one or more devices (e.g., memory units, memory devices, storage devices, etc.) for storing data and/or computer code for completing and/or facilitating the various processes described in the present disclosure. Memory 502 may include random access memory (RAM), read-only memory (ROM), hard drive storage, temporary storage, non-volatile memory, flash memory, optical memory, or any other suitable memory for storing software objects and/or computer instructions. The memory 502 may include database components, object code components, script components, or any other type of information structure for supporting the various activities and information structures described in the present disclosure. The memory 502 may be communicably connected to processor 501 via a processing circuit and may include computer code for executing (e.g., by processor 501) one or more processes described herein. For example, the memory 502 may include graphics, web pages, HTML files, XML files, script code, configuration files, or other resources for use in generating graphical user interfaces for display and/or for use in interpreting user interface inputs to make command, control, or communication decisions.

In an embodiment, one processor 501 is shown in FIG. 5. The processor 501 in the present disclosure can be implemented by any appliances or by any software or applications run by the appliances. The processor 501 may be connected to a workstation or another external device (e.g., control panel, remote) and/or a database for receiving user inputs, system characteristics, and any of the values described herein. The processor 501 may include a controller. Optionally, the processor 501 may include an input device and/or a sensing circuit in communication with any of the sensors. The sensing circuit receives sensor measurements from the sensors as described above. Optionally, the processor 501 may include a drive unit for receiving and reading non-transitory computer media having instructions. Additional, different, or fewer components may be included. The processor 501 is configured to perform instructions stored in the memory 502 for executing the algorithms described herein.

The processor 501 may be a general purpose or specific purpose processor, an application specific integrated circuit (ASIC), one or more programmable logic processors (PLCs), one or more field programmable gate arrays (FPGAs), a group of processing components, or other suitable processing components. The processor 501 is configured to execute computer code or instructions stored in memory or received from other computer readable media (e.g., embedded flash memory, local hard disk storage, local ROM, network storage, a remote server, etc.). The processor 501 may be a single device or combinations of devices, such as associated with the network, distributed processing, or cloud computing.

The electronic device may also comprise an input device 503 and a display device 504.

The processor 501, the memory 502, the input device 503, and the display device 504 may be connected via a bus or other means, and the connection via a bus is shown as an example.

The memory 502, as a non-volatile computer readable storage medium, can be used to store non-volatile software programs, non-volatile computer executable programs, and modules, such as the program instructions/modules corresponding to the intelligent toilet temperature adjustment method according to this embodiment, for example, the method flow shown in FIG. 1, FIG. 2, and FIG. 4. The processor 501 executes various functional applications and data processing by running the non-volatile software programs, instructions, and modules stored in the memory 502, e.g., to realize the intelligent toilet temperature adjustment method in the above embodiments.

The memory 502 may comprises a stored program area and a stored data area. The stored program area may store the operating system and at least one the application program required by function. The stored data area may store data created based on the use of the intelligent toilet temperature adjustment method, etc. In addition, the memory 502 may comprise high-speed random access memory and may also comprise non-volatile memory, such as at least one disk memory device, flash memory device, or other non-volatile solid state memory device. In some embodiments, the memory 502 may comprise memories that is remotely located relative to the processor 501, and these remote memories may be connected via a network to a device that performs an intelligent toilet temperature adjustment method. Examples of the networks comprises, but are not limited to, the Internet, corporate intranets, local area networks, mobile communication networks, and the combinations thereof.

The input device 503 may receive input user clicks and generate a signal input related to user settings as well as function control of the intelligent toilet temperature adjustment method. The display device 504 may comprise a display device, such as a display screen.

The one or more modules are stored in the memory 502. When run by the one or more processors 501, the one or more modules may execute the temperature adjustment method for the intelligent toilet in any of the methods described above.

In an embodiment, the electronic device may also comprise a communication interface. The communication interface may include any operable connection. An operable connection may be one in which signals, physical communications, and/or logical communications may be sent and/or received. An operable connection may include a physical interface, an electrical interface, and/or a data interface. The communication interface may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The indoor temperature may be obtained from the air temperature sensor of the intelligent toilet when the warm air function or the flushing function remains inactivated for a continuous preset time duration. Thus, the air temperature sensor within the intelligent toilet may be used to obtain the indoor temperature without additionally increasing sensor costs. After the indoor temperature is obtained, the temperature setting of the intelligent toilet is automatically adjusted. Thus, user operations may be simplified to facilitate the use for more user groups, and energy may be saved.

In another embodiment, the present disclosure provides a storage medium configured to store computer instructions for performing all steps of the intelligent toilet temperature adjustment methods as described above when a computer executes the computer instructions.

In another embodiment, the present disclosure provides an intelligent toilet. The intelligent toilet comprises a toilet body and an electronic device as described above. A blower 2 and a warm air heater 3 are disposed in an air duct of the toilet body. An air temperature sensor 4 is disposed at an air outlet and is communicatively connected to the electronic device. The electronic device performs the intelligent toilet temperature adjustment methods as described above.

In another embodiment, the intelligent toilet may further include a base (e.g., a pedestal, bowl, etc.) and a tank. The base is configured to be attached to another object such as a drainpipe, floor, or another suitable object. The base includes a bowl, a sump (e.g., a receptacle) disposed below the bowl, and a trapway fluidly connecting the bowl to a drainpipe or sewage line. The tank may be supported by the base, such as an upper surface of a rim. The tank may be integrally formed with the base as a single unitary body. In other embodiments, the tank may be formed separately from the base and coupled (e.g., attached, secured, fastened, connected, etc.) to the base. The intelligent toilet may further include a tank lid covering an opening and inner cavity in the tank. The intelligent toilet may include a seat assembly including a seat and a seat cover rotatably coupled to the base. The intelligent toilet arrangement may further include a hinge assembly.

In another embodiment, the intelligent toilet arrangement may be a tankless toilet. The intelligent toilet arrangement includes a base and a seat assembly coupled to the base. The base includes a bowl, a sump disposed below the bowl, and a trapway fluidly connecting the bowl to a drainpipe or sewage line. The intelligent toilet arrangement includes a waterline that supplies the intelligent toilet with water. The intelligent toilet may further include a seat assembly including a seat and a seat cover rotatably coupled to the base. The intelligent toilets described above are provided herein as non-limiting examples of toilets that may be configured to utilize aspects of the present disclosure.

In some examples, a bidet may be included in a seat or pedestal of a toilet. In other examples, the bidet may be manufactured separately from and attached or coupled to a seat or pedestal of a toilet. The bidet includes a housing. The housing is configured to receive a flow of water through a housing inlet and dispense the flow of water from a housing outlet. The housing inlet and housing outlet may be located on opposite ends of the housing from one another, such that water may flow through the housing from the housing inlet to the housing outlet. In some examples, the housing further includes a chamber. As the housing receives the flow of water, the chamber may fill with water and provide a flow of water between the housing inlet and the housing outlet. The chamber may be configured to contain the flow of water and direct the flow of water from the housing inlet to the housing outlet. After the chamber has filled with water, the flow of water may travel along a substantially linear path between the housing inlet and the housing outlet. In some examples, one or more walls within the housing may be included to help direct a flow of water between the housing inlet and the housing outlet. The bidet may further include a housing inlet conduit configured to direct a flow of water to the housing inlet. The housing inlet conduit may be coupled to a water supply such as tank or waterline. The housing may further include a gear assembly or a portion of the gear assembly.

Specifically, the electronic device obtains the measured value from the air temperature sensor 4 to obtain the indoor temperature and executes the intelligent toilet temperature adjustment methods as described above to determine the temperature setting of the intelligent toilet.

The indoor temperature may be obtained from the air temperature sensor of the intelligent toilet when the warm air function or the flushing function remains inactivated for a continuous preset time duration. Thus, the air temperature sensor within the intelligent toilet may be used to obtain the indoor temperature without additionally increasing sensor costs. After the indoor temperature is obtained, the temperature setting of the intelligent toilet is automatically adjusted. Thus, user operations may be simplified to facilitate the use for more user groups, and energy may be saved.

The above-described embodiments only express several embodiments of the present disclosure, and their descriptions are specific and detailed. However, the embodiments are not intended to limit the protection scope of the present disclosure. It should be pointed out that, for those having ordinary skill in the art, other modifications and improvements may be made based on the principle of the present disclosure and should also be regarded as falling in the protection scope of the present disclosure. Therefore, the protection scope of present disclosure shall be subject to the appended claims.

We claim:

1. A temperature adjustment method by using an intelligent toilet, the method comprising:
    obtaining an indoor temperature from an air temperature sensor of the intelligent toilet in response to a determination that a warm air function or a flushing function remains inactivated for a preset time duration;
    determining a to-be-adjusted temperature setting according to the indoor temperature; and
    setting a current temperature setting of the intelligent toilet to the to-be-adjusted temperature setting in response to a determination that the current temperature setting of the intelligent toilet is different from the to-be-adjusted temperature setting.

2. The temperature adjustment method according to claim 1, wherein obtaining the indoor temperature from the air temperature sensor of the intelligent toilet comprises:
    obtaining the indoor temperature from the air temperature sensor disposed in an air outlet duct of the intelligent toilet and disposed at an air outlet of the air outlet duct.

3. The temperature adjustment method according to claim 1, wherein obtaining the indoor temperature from the air temperature sensor of the intelligent toilet comprises:
    obtaining a measured value from the air temperature sensor of the intelligent toilet; and
    correcting the measured value based on a preset compensation value to obtain the indoor temperature.

4. The temperature adjustment method according to claim 3, wherein correcting the measured value based on the preset compensation value to obtain the indoor temperature comprises:
    adding the preset compensation value to the measured value obtained from the air temperature sensor of the intelligent toilet.

5. The temperature adjustment method according to claim 1, wherein obtaining the indoor temperature from the air temperature sensor of the intelligent toilet comprises:
    starting a timing for the preset time duration;
    restarting the timing, in response to a determination that the warm air function or the flushing function is activated during the preset time duration; and
    obtaining the indoor temperature from the air temperature sensor of the intelligent toilet, in response to a determination that the timing is ended after the preset time duration.

6. The temperature adjustment method according to claim 1, wherein determining the to-be-adjusted temperature setting according to the indoor temperature comprises:
    obtaining the current temperature setting of the intelligent toilet;
    obtaining one or more return difference temperature ranges corresponding to the current temperature setting;
    using the one or more return difference temperature ranges as one or more current return difference temperature ranges; and
    in response to a determination that the indoor temperature is within one of the one or more current return difference temperature ranges, using the current temperature setting as the to-be-adjusted temperature setting, or otherwise using a temperature setting corresponding to the indoor temperature as the to-be-adjusted temperature setting.

7. The temperature adjustment method according to claim 6, further comprising:

in response to a determination that $T<T1$, determining that the temperature setting corresponding to the indoor temperature is a third setting;

in response to a determination that $T1 \leq T \leq T2$, determining that the temperature setting corresponding to the indoor temperature is a second setting;

in response to a determination that $T2<T \leq T3$, determining that the temperature setting corresponding to the indoor temperature is a first setting; and in response to a determination that $T>T3$, determining that the temperature setting corresponding to the indoor temperature is a closed setting;

wherein T is the indoor temperature, T1 is a first temperature threshold, T2 is a second temperature threshold, T3 is a third temperature threshold, and $T1<T2<T3$.

8. The temperature adjustment method according to claim 7, wherein using the one or more return difference temperature ranges corresponding to the current temperature setting as the one or more current return difference temperature ranges comprises:

in response to a determination that the current temperature setting is the third setting, determining that the return difference temperature range corresponding to the current temperature setting is $T1L<T<T1H$, wherein T1L is a lower limit value of the first temperature threshold and T1H is an upper limit value of the first temperature threshold;

in response to a determination that the current temperature setting is the second setting, determining that the return difference temperature range corresponding to the current temperature setting is $T1L<T<T1H$ and/or $T2L<T<T2H$, wherein T2L is a lower limit value of the second temperature threshold and T2H is an upper limit value of the second temperature threshold;

in response to a determination that the current temperature setting is the first setting, determining that the return difference temperature range corresponding to the current temperature setting is $T2L<T<T2H$ and/or $T3L<T<T3H$, wherein T3L is a lower limit value of the third temperature threshold and T3H is an upper limit value of the third temperature threshold; and in response to a determination that the current temperature setting is the closed setting, determining that the return difference temperature range corresponding to the current temperature setting is $T3L<T<T3H$.

9. An electronic device, comprising:

at least one processor; and a memory communicatively connected to the at least one processor, wherein the at least one processor is configured to:

obtain an indoor temperature from an air temperature sensor in response to a determination that a warm air function or a flushing function remains inactivated for a preset time duration;

determine a to-be-adjusted temperature setting according to the indoor temperature; and set a current temperature setting of an intelligent toilet to the to-be-adjusted temperature setting in response to a determination that the current temperature setting of the intelligent toilet is different from the to-be-adjusted temperature setting.

10. The electronic device according to claim 9, wherein the at least one processor is configured to:

obtain the indoor temperature from the air temperature sensor disposed in an air outlet duct of the intelligent toilet and disposed at an air outlet of the air outlet duct.

11. The electronic device according to claim 9, wherein the at least one processor is configured to:

obtain a measured value from the air temperature sensor of the intelligent toilet; and correct the measured value based on a preset compensation value to obtain the indoor temperature.

12. The electronic device according to claim 11, wherein the at least one processor is configured to:

add the preset compensation value to the measured value obtained from the air temperature sensor of the intelligent toilet.

13. The electronic device according to claim 9, wherein the at least one processor is configured to:

start a timing for the preset time duration;

restart the timing, in response to a determination that the warm air function or the flushing function is activated during the preset time duration; and obtain the indoor temperature from the air temperature sensor of the intelligent toilet, in response to a determination that the timing is ended after the preset time duration.

14. The electronic device according to claim 9, wherein the at least one processor is configured to:

obtain the current temperature setting of the intelligent toilet;

obtain one or more return difference temperature ranges corresponding to the current temperature setting;

use the one or more return difference temperature ranges as one or more current return difference temperature ranges; and in response to a determination that the indoor temperature is within one of the one or more current return difference temperature ranges, use the current temperature setting as the to-be-adjusted temperature setting, or otherwise use a temperature setting corresponding to the indoor temperature as the to-be-adjusted temperature setting.

15. The electronic device according to claim 14, wherein the at least one processor is configured to:

in response to a determination that $T<T1$, determine that the temperature setting corresponding to the indoor temperature is a third setting;

in response to a determination that $T1 \leq T \leq T2$, determine that the temperature setting corresponding to the indoor temperature is a second setting;

in response to a determination that $T2<T \leq T3$, determine that the temperature setting corresponding to the indoor temperature is a first setting; and in response to a determination that $T>T3$, determine that the temperature setting corresponding to the indoor temperature is a closed setting, and wherein T is the indoor temperature, T1 is a first temperature threshold, T2 is a second temperature threshold, T3 is a third temperature threshold, and $T1<T2<T3$.

16. The electronic device according to claim 15, wherein the at least one processor is configured to:

in response to a determination that the current temperature setting is the third setting, determine that the return difference temperature range corresponding to the current temperature setting is $T1L<T<T1H$, wherein T1L is a lower limit value of the first temperature threshold and T1H is an upper limit value of the first temperature threshold;

in response to a determination that the current temperature setting is the second setting, determine that the return difference temperature range corresponding to the current temperature setting is $T1L<T<T1H$ and/or $T2L<T<T2H$, wherein T2L is a lower limit value of the second temperature threshold and T2H is an upper limit value of the second temperature threshold;

in response to a determination that the current temperature setting is the first setting, determine that the return difference temperature range corresponding to the current temperature setting is $T2L<T<T2H$ and/or $T3L<T<T3H$, wherein T3L is a lower limit value of the third temperature threshold and T3H is an upper limit value of the third temperature threshold; and in response to a determination that the current temperature setting is the closed setting, determine that the return difference temperature range corresponding to the current temperature setting is $T3L<T<T3H$.

17. An intelligent toilet, comprising:

a toilet body, comprising an air duct;

a blower, disposed in the air duct;

a warm air heater, disposed in the air duct; and an air temperature sensor, disposed at an air outlet of the air duct and configured to detect a warm air temperature when the warm air heater and the blower are turned on and detect an indoor temperature when the warm air heater and the blower are turned off; and; and an electronic device, communicatively connected to the air temperature sensor and comprising at least one processor, wherein the at least one processor is configured to:

obtain the indoor temperature from the air temperature sensor in response to a determination that a warm air function or a flushing function remains inactivated for a preset time duration;

determine a to-be-adjusted temperature setting according to the indoor temperature; and set a current temperature setting of the intelligent toilet to the to-be-adjusted temperature setting in response to a determination that the current temperature setting of the intelligent toilet is different from the to-be-adjusted temperature setting.

18. The intelligent toilet according to claim 17, wherein the at least one processor is configured to:

obtain a measured value from the air temperature sensor of the intelligent toilet; and correct the measured value based on a preset compensation value to obtain the indoor temperature.

19. The intelligent toilet according to claim 18, wherein the at least one processor is configured to:

add the preset compensation value to the measured value obtained from the air temperature sensor of the intelligent toilet.

20. The intelligent toilet according to claim 17, wherein the at least one processor is configured to:

start a timing for the preset time duration;

restart the timing, in response to a determination that the warm air function or the flushing function is activated during the preset time duration; and obtain the indoor temperature from the air temperature sensor of the intelligent toilet, in response to a determination that the timing is ended after the preset time duration.

* * * * *